June 20, 1967  D. TANN  3,326,584
FASTENING DEVICE

Filed Nov. 5, 1963

INVENTOR.
DAVID TANN
BY
Lane Aitken Dunner & Ziems
ATTORNEYS

June 20, 1967   D. TANN   3,326,584
FASTENING DEVICE

Filed Nov. 5, 1963   2 Sheets-Sheet 2

INVENTOR.
DAVID TANN
BY
Lane Aitken Dunner & Ziems
ATTORNEYS

United States Patent Office 3,326,584
Patented June 20, 1967

3,326,584
FASTENING DEVICE
David Tann, 333 Covington Road,
Detroit, Mich. 48203
Filed Nov. 5, 1963, Ser. No. 321,482
1 Claim. (Cl. 287—52.09)

The present invention relates to mechanical fastening devices, and more particularly to a frusto-conical set screw for fastening two members together.

In accordance with the present invention two members having confronting surfaces which are slidable relative to one another but restrained against transverse separation are secured together by a simple frusto-conical set screw. The set screw is positioned within a frusto-conical recess in one of the surfaces. The recess is not threaded and is open along one side thereof so as to expose the thread of the set screw to the other surface. When the set screw is advanced and rotated, it cuts into the wall of the recess and the other surface to firmly lock the members together, the set screw being substantially tangential to the other surface.

The frusto-conical set screw can be used to fasten many different types of members together. For example, it can be used to fasten end plates to housings, gears and pulleys to shafts, bushings to punch shafts for providing stop shoulders, and so forth. When the frusto-conical set screw is used to fix pulleys or gears on a shaft it is self-tightening in one direction of rotation of the pulley or gear. Also, as will be described in greater detail hereinafter, the frusto-conical set screw can eliminate the need for, or reduce the length of, a hub on a gear or pulley, since in many cases the hub is provided merely for the purpose of accommodating the conventional set screw which is advanced radially through the wall of the hub into engagement with the shaft.

Accordingly, it is one object of the present invention to provide a simple, economical and effective screw fastener for securing two members together.

It is another object of the invention to provide a frusto-conical set screw which can be used to secure two members together without providing internal threads on either of the members.

It is a further object of the invention to provide a screw fastener having a frusto-conical portion with a special screw thread thereon which enables the screw fastener to more effectively secure two members together.

It is a still further object of the invention to secure a rotating member such as a pulley or gear to a shaft in a simple, economical and effective manner.

It is a still further object of the invention to provide a frusto-conical set screw for fastening pulleys, gears and the like to a shaft in a manner to enable the hub of the pulley or gear to be entirely eliminated or substantially reduced in length.

Other objects and features of novelty of the present invention will be specifically pointed out or will otherwise become apparent when referring, for a better understanding of the invention, to the following description taken in conjunction with the accompanying drawings, wherein.

Figure 1:
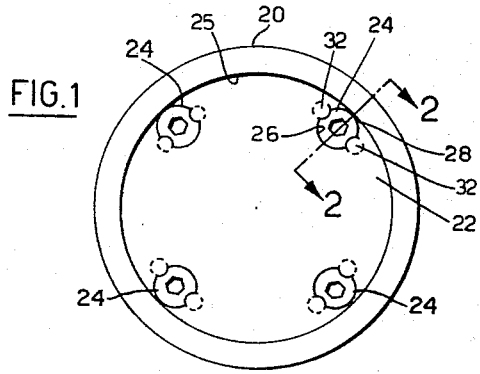
FIG. 1 is an end view of a cylindrical housing having a cover plate secured thereto in accordance with the present invention.
Figure 2:
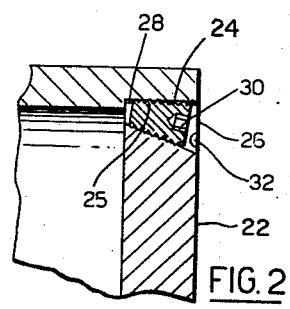
FIG. 2 is an enlarged fragmentary sectional view taken along the line 2—2 of FIG. 1.

Referring to FIGS. 1 and 2, a cylindrical housing 20 is illustrated having a cover plate 22 secured within the end thereof by frusto-conical set screws 24 in accordance with the present invention. Four frusto-conical recesses 26 are provided in the periphery of the cover plate 22. Each of the recesses has an axially extending opening 28 in the radially outer portion thereof which communicates the recess with the inner cylindrical surface 25 of the cylindrical housing 20. Consequently when the set screw is positioned within each of the recesses, and is rotated by an Allen wrench engaged in a socket 30 in the end of the set screw, the screw thread will cut into the wall of the frusto-conical recess 26 and a portion thereof will project through the axial opening 28 of each of the recesses to cut into the inner cylindrical surface 25 of the cylindrical housing 20.

In the particular embodiment illustrated in FIGS. 1 and 2, the axis of the frusto-conical recess 26 extends through the axis of the cylindrical housing 20 and forms a small acute angle of about 5° with the axis of the housing and also with the line on the inner cylindrical surface 25 of the housing defined by the plane which includes both the axis of the frusto-conical recess 26 and the axis of the cylindrical housing 20. The angle at the apex of the cone defined by the frusto-conical recess 26 is about twice the acute angle of 5° or about 10°. Therefore the frusto-conical surface of the set screw 24 is substantially tangential to the inner cylindrical surface and the set screw engages the inner cylindrical surface 25 along what may be referred to as a line contact.

By using the frusto-conical set screw 24 of the present invention, the need for headed bolts is eliminated and the cover plate does not have to be backed up by portions of the cylindrical housing 20 large enough to enable tapped holes to be formed therein for receiving the headed bolts. If desired, portions 32 of the cover plate 22 may be peened over at the opening of the recess 26 on the outer surface of the cover plate to prevent the set screw 24 from escaping from the recess 26 when it is released to enable the cover plate 22 to be removed.

Figure 3:
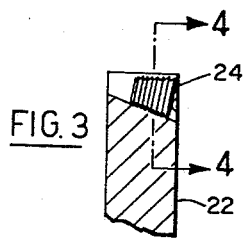
FIG. 3 is a fragmentary sectional view of the cover plate as illustrated in FIG. 2 before it is attached to the cylindrical housing.
Figure 4:
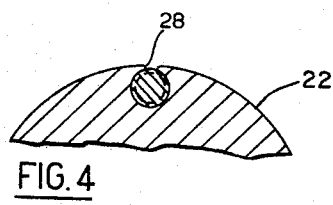
FIG. 4 is a fragmentary sectional view taken along the line 4—4 of FIG. 3.

Referring to FIGS. 3 and 4, when the set screws 24 are initially inserted into the cover plate 22 before it is assembled to the end of the cylindrical housing 20, the sides of the set screws preferably do not project through the axial openings 28 beyond the periphery of the cover plate when they are advanced into contact with the walls of the frusto-conical recesses 26. This prevents the set screws from interfering with the insertion of the cover plate 22 into the end of the cylindrical housing 20. After the cover plate 22 is positioned within the end of the cylindrical housing 20, each of the set screws 24 can be advanced from the position illustrated in FIGS. 3 and 4 by rotating it with an Allen wrench as previously described. As the thread of the set screw begins to cut into the wall of the recess 26, it will project through the opening 28 and cut into the inner cylindrical surface 25 of the cylindrical housing to firmly lock the cover plate 22 on the cylindrical housing.

Figure 5:
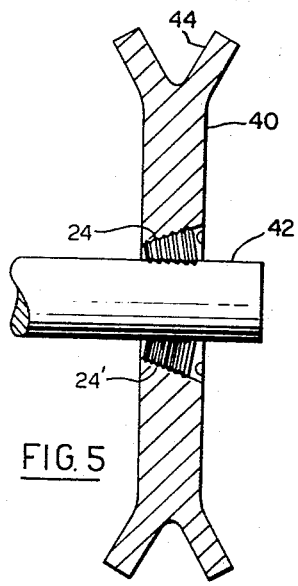
FIG. 5 is a sectional view of a pulley secured to a shaft in accordance with the present invention.

Referring to FIG. 5, another application for the set screw 24 is illustrated wherein it keys a pulley 40 for rotation with a shaft 42. The pulley is a new type of pulley recently developed in which the pulley groove 44 is formed in the periphery of a flat disc by a parting operation so that each wall of the pulley groove has a thickness equal to one-half of the thickness of the body of the disc. Prior to the present invention a separable hub had to be attached to the pulley, oftentimes for the sole purpose of accommodating a conventional set screw which projects radially through the wall of the hub. Admittedly the additional axial length provided by a hub provides greater resistance against wobble, but for many small pulley applications wobble is not a problem and a hub is in fact primarily provided for accommodating the conventional set screw as already mentioned. The addition of the hub approximately doubles the manufacturing cost of this otherwise relatively inexpensive high quality pulley.

As illustrated in FIG. 5, the frusto-conical set screw 24 effectively keys the pulley 40 to the shaft 42 for rotation therewith in a simple, effective manner which eliminates the need for a hub. In addition, the set screw 24 is self-tightening in one direction of rotation of the pulley. The more the pulley tries to rotate in this one direction relative to the shaft the deeper the set screw 24 cuts into the shaft and wall of the recess 26. If desired, a second set screw 24' may be utilized as illustrated in FIG. 5 having an opposite hand thread, that is one set screw having a right-hand thread and the other a lefthand thread. Therefore if the pulley 40 attempts to rotate relative to the shaft 42 in one direction, the right-hand set screw is self-tightening and if the pulley attempts to rotate relative to the shaft in the other direction the left-hand set screw is self-tightening. As in the embodiment of FIGS. 1 and 2, the portions 32 are peened over to prevent the set screws 24 and 24' from escaping when they are unscrewed to release their grip on the shaft 42.

Figure 6:
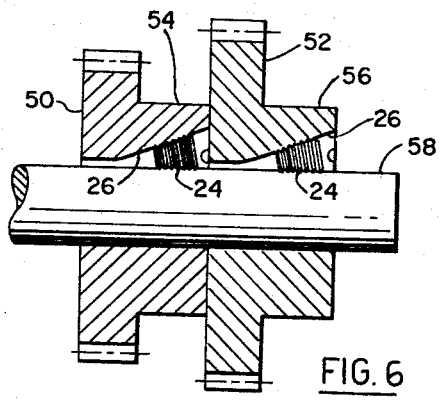
FIG. 6 is a sectional view of a pair of gears secured to a shaft in accordance with the invention.

Referring to FIG. 6, a pair of gears 50 and 52 are illustrated having hubs 54 and 56. Each of the gears is keyed to a shaft 58 by a frusto-conical set screw 24. Since each of the set screws 24 are recessed relative to the end faces of the hubs 54 and 56, the gear 52 may be abutted directly against the end of the hub 54. If the gears are cast gears, the frusto-conical recess 26 in each of the gears can be formed in the casting operation by the simple expedient of providing a core. Thus the recesses are obtained at no extra cost, since the wall of the recess can be used as cast and does not have to be machined. If the gears 50 can be provided with either left or right-drives the gear 52, the set screw 24 associated with the gear 50 can be provided with either left or right-hand thread, whichever will provide a self-tightening action, and the set screw 24 associated with the gear 52 can be provided with an opposite hand thread to provide a self-tightening action.

Figure 7:
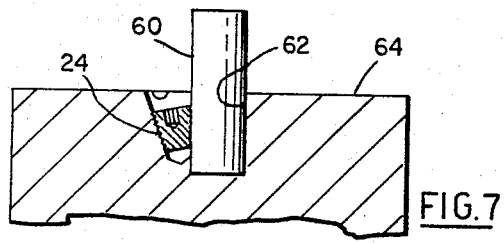
FIG. 7 is a fragmentary sectional view of a dowel pin secured to a body in accordance with the invention.

Referring to FIG. 7, another application of the present invention is illustrated wherein a dowel pin 60 is fixed within a blind hole 62 in a body 64 by a frusto-conical set screw 24. It is apparent that the set screw enables the dowel pin 60 to be locked to the body 64 in a very simple manner irrespective of the distance of the dowel pin from the nearest side wall of the body or the distance of the end of the dowel pin from an outer wall of the body.

Figure 8:
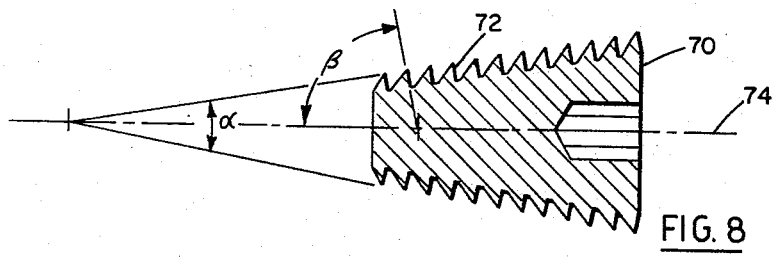
FIG. 8 is an enlarged sectional view of a frustro-conical set screw embodying features of the invention.
Figure 9:
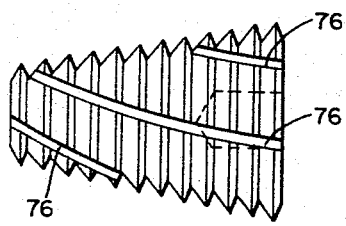
FIG. 9 is a side view of the frusto-conical set screw of FIG. 8.
Figure 10:
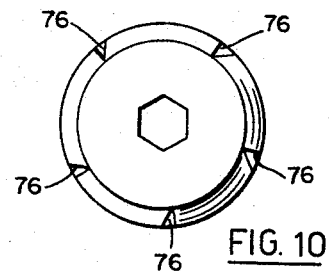
FIG. 10 is an end view of the frusto-conical set screw illustrated in FIG. 9.

Referring to FIGS. 8–10, a frusto-conical set screw 70 is illustrated which has a buttress screw thread formed thereon. It has been found that a buttress thread provides a better holding action for keying softer pulleys, such as zinc die cast pulleys, to steel shafts than the conventional V thread as illustrated in the other embodiments. In a conventional buttress screw thread formed on the cylindrical surface of a bolt or screw, the thrust face 72 is perpendicular to the axis of the cylindrical surface. However, it has been discovered that if the thrust face 72 of the buttress screw thread is made perpendicular to the frusto-conical surface of the set screw 70 rather than to the axis of the set screw, and if the thrust face is presented toward the large end of the set screw, the holding action of the set screw 70 is significantly improved still further. Referring specifically to FIG. 8, α is the angle at the apex of the cone defined by the frusto-conical surface of the set screw 70. The angle β is the angle which the thrust face 72 of the screw thread makes with the axis 74 of the set screw. Since the thrust face 72 is perpendicular to the frusto-conical surface of the set screw as just described, the angle β plus one-half the angle α equals 90°.

As most clearly illustrated in FIGS. 9 and 10, a plurality of spiral grooves 76 are also formed in the buttress screw thread to enhance the cutting action of the thread.

The frusto-conical set screw 70 has proved to be particularly advantageous for keying large diameter die cast pulleys to shafts. With smaller diameter pulleys, the set screw 24 with a conventional V thread provides an excellent keying action and is self-tightening as described. However, in the case of a larger diameter pulley, such as a pulley with a 16" diameter, it was found that the force applied by the pulley belt at the periphery of the pulley multiplied by the radius of the pulley produced an exceptionally large torque which could cause the pulley to rotate or slip relative to the shaft. Tests have proved that the frusto-conical set screw 70 with the buttress screw thread having the thrust face 72 oriented as described, effectively eliminated the occasional slippage experienced in connection with 16" die cast pulleys. Since the thrust face 72 is perpendicular to the frusto-conical surface of the set screw, it is also perpendicular to the surface of the shaft on which the pulley is mounted, such as the shaft 42 in FIG. 5. It is believed that this enables the thread to cut deeper into the shaft 42 and thus provide a greater resistance to the slippage sometimes experienced with larger diameter pulleys. The thrust face is also perpendicular to the frusto-conical wall of the recess 26, but by orienting the thrust face so that it faces toward the large end of the set screw, it is believed that the back sloping face of the buttress thread tends to impede the cutting action of the thread against the wall of the recess to a greater extent than would be the case if the thrust face of the thread were faced in the opposite direction. This has proved to be important in the case of large diameter zinc die cast pulleys, since when the self-tightening action occurs in response to large torques, the set screw 24 with the conventional V thread tends to cut more deeply into the softer zinc without significantly increasing its penetration into the steel shaft. It has been found that the frusto-conical set screw 70 with the buttress screw thread will cut deeper into the steel shaft and not quite as deep into the softer zinc metal as compared to the set screw 24 and thus is able to resist far larger torques.

As already mentioned an angle of about 10° has been found to be advantageous for the angle α. This angle can be increased to about 18° or more and still provide a set screw (with or without a buttress screw thread) for effectively keying soft metal (zinc) pulleys or the like to steel shafts. However, if the angle α is reduced much below 10°, to 1° or 2° for example, the self-tightening action rotates the set screw in a manner to advance it axially so that it might drive itself right through a zinc pulley. For this reason, an angle α of about 10° is preferred for keying soft metal members, such as zinc pulleys, to steel shafts.

While it will be apparent that the embodiments of the invention herein disclosed are well calculated to fulfill the objects of the invention, it will be appreciated that the invention is susceptible to modification, variation and change without departing from the proper scope or fair meaning of the subjoined claim.

What is claimed is:

In combination, a threadless shaft, a member rotatably mounted on said shaft, a frusto-conical recess in said member communicating with an end face thereof and with the surface of said shaft, and a headless screw positioned within said recess, said screw grippingly engaging the wall of said recess and the surface of said screw being substantially tangential to said shaft, a second frusto-conical recess formed in said member similar to the first mentioned recess and circumferentially spaced therefrom, and a second head screw is positioned within said second recess to grippingly engage the wall of said recess and the surface of said shaft, the first mentioned said screw having a right-hand thread thereon and the second mentioned said screw having a left-hand thread thereon.

References Cited

UNITED STATES PATENTS

| 1,253,919 | 1/1918 | Williams | 151—23 |
| 1,260,154 | 3/1918 | Day | 85—46 |
| 1,940,455 | 12/1933 | Kilpela | 287—52.08 X |
| 2,005,672 | 6/1935 | Chaffee | 85—46 |
| 2,446,291 | 8/1948 | McAfee | 85—46 X |
| 2,509,711 | 5/1950 | Williams. | |
| 2,524,443 | 10/1950 | Huffman | 306—34 X |
| 2,550,511 | 4/1951 | Williams | 85—1 |
| 2,562,516 | 7/1951 | Williams | 85—47 X |

OTHER REFERENCES

American Machinist, Metalworking, Manufacturing, publication of Aug. 21, 1961, page 119, screw thread form 105.

CARL W. TOMLIN, *Primary Examiner.*

A. V. KUNDRAT, *Assistant Examiner.*